United States Patent
Wen et al.

(10) Patent No.: US 10,458,860 B2
(45) Date of Patent: Oct. 29, 2019

(54) CAPACITIVE TEMPERATURE SENSING FOR ELECTRICAL CONDUCTOR

(71) Applicant: 3M INNOVATIVE PROPERTIES COMPANY, St. Paul, MN (US)

(72) Inventors: Zhiguo Wen, Shanghai (CN); Jaewon Kim, Woodbury, MN (US); Justin M. Johnson, Hudson, WI (US); Xeutao Yu, Shanghai (CN); David V. Mahoney, Austin, TX (US); Michael D. Benson, Austin, TX (US); Christopher D. Sebesta, Brooklyn, NY (US); Myungchan Kang, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 117 days.

(21) Appl. No.: 15/522,337

(22) PCT Filed: Oct. 30, 2014

(86) PCT No.: PCT/CN2014/089897
§ 371 (c)(1),
(2) Date: Apr. 27, 2017

(87) PCT Pub. No.: WO2016/065574
PCT Pub. Date: May 6, 2016

(65) Prior Publication Data
US 2017/0315000 A1    Nov. 2, 2017

(51) Int. Cl.
*G01K 7/34* (2006.01)
*G01K 13/00* (2006.01)
(Continued)

(52) U.S. Cl.
CPC ............. *G01K 7/343* (2013.01); *G01K 13/00* (2013.01); *H01B 7/324* (2013.01); *H01B 9/006* (2013.01);
(Continued)

(58) Field of Classification Search
CPC ............ G01K 7/34; G01K 7/01; G01K 13/00; G01K 2217/00
See application file for complete search history.

(56) References Cited

U.S. PATENT DOCUMENTS 3,260,116 A    7/1966  Grady
3,365,946 A *  1/1968  Hall .......................... G01K 7/34
                                                  200/83 C
(Continued)

FOREIGN PATENT DOCUMENTS

CN    101319938    4/2010
CN    102607498 A  7/2012
(Continued)

OTHER PUBLICATIONS

International Search Report for PCT International Application No. PCT/CN2014/089897, dated Aug. 5, 2015, 5 pages.

*Primary Examiner* — Gail Kaplan Verbitsky
(74) *Attorney, Agent, or Firm* — Yufeng Dong (57) ABSTRACT

Provided is a system for directly sensing, measuring, or monitoring the temperature of an electrical conductor (31) of a power cable (10). A temperature sensitive capacitor (21C) is disposed in direct thermal contact with the electrical conductor (31). The temperature sensitive capacitor (21C) includes a dielectric material that has a dielectric constant variable with the temperature of the electrical conductor (31). The temperature of the electrical conductor (31) can be sensed, measured, or monitored by measuring the capacitance of the temperature sensitive capacitor (21C).

13 Claims, 6 Drawing Sheets

(51) Int. Cl.
*H01B 7/32* (2006.01)
*H01B 9/00* (2006.01)
*H01G 7/04* (2006.01)

(52) U.S. Cl.
CPC ............ *H01B 9/008* (2013.01); *H01G 7/04* (2013.01); *G01K 7/34* (2013.01)

(56) References Cited

U.S. PATENT DOCUMENTS

| | | | | |
|---|---|---|---|---|
| 4,378,525 A | * | 3/1983 | Burdick | G01R 1/22 |
| | | | | 324/117 R |
| 4,794,323 A | * | 12/1988 | Zhou | G01K 7/223 |
| | | | | 324/71.5 |
| 5,635,812 A | | 6/1997 | Eschbach et al. | |
| 5,788,376 A | | 8/1998 | Sultan et al. | |
| 9,304,047 B2 | | 4/2016 | Huang | |
| 10,139,288 B2 | * | 11/2018 | Ghosh | G01K 7/38 |
| 2014/0064926 A1 | * | 3/2014 | Warren | F01D 11/20 |
| | | | | 415/118 |
| 2014/0232375 A1 | * | 8/2014 | Fauveau | H04R 15/00 |
| | | | | 324/109 |
| 2014/0334521 A1 | | 11/2014 | Wu | |

FOREIGN PATENT DOCUMENTS

| | | |
|---|---|---|
| CN | 202649374 | 1/2013 |
| CN | 102539005 | 6/2013 |
| CN | 203224309 | 10/2013 |
| CN | 102175341 | 11/2013 |
| CN | 103471740 | 11/2015 |
| DE | 4035952 | 6/1992 |
| JP | 2002195890 | 7/2002 |
| JP | 2004294353 A * | 10/2004 |
| JP | 2009053025 | 3/2009 |
| JP | 4980824 | 7/2012 |
| WO | 2014-176784 | 11/2014 |
| WO | 2015-047740 | 4/2015 |

* cited by examiner

CAPACITIVE TEMPERATURE SENSING FOR ELECTRICAL CONDUCTOR

CROSS REFERENCE TO RELATED APPLICATIONS

This application is a national stage filing under 35 U.S.C. 371 of PCT/CN2014/089897, filed Oct. 30, 2014, the disclosure of which is incorporated by reference in its/their entirety herein.

TECHNICAL FIELD

The present disclosure relates to systems for monitoring temperature of an electrical conductor, and in particular, to systems for monitoring temperature of an electrical conductor enclosed in at least a (semi)conductive layer, for example, an electrical conductor of an electrical power cable in a power distribution system.

BACKGROUND

Medium and high voltage power distribution systems play an important role in modern society. Safety and security are always considerable factors for the "health" of power distribution system. Accordingly, there should be a technology that enables monitoring of the "health" of the power distribution system.

In a power distribution system such as a medium or high voltage power distribution system, the temperature of conductors of electrical cables may increase as currents carried by the cables increase. Accordingly, the "health" of such system can be assessed by monitoring the temperature of the on-line electrical conductor, for example, at the cable splices or the junctions, which may be the weak points, in such a system. Usually, normal currents flowing through the cable splices or the junctions may create a temperature of up to, for example, about 90° C. If the temperatures of the cable splices or the junctions were to increase beyond that, it could be an indication that something may be wrong in this power distribution system. On the other hand, it is also useful to know if the existing power distribution system is at maximum current carrying capacity, to know if additional power can be reliably distributed with the existing system, or, to know if additional infrastructure expenditures are needed.

SUMMARY

On-line power cables, as well as the cable splices and the junctions, for example, in medium or high voltage power distribution systems are typically insulated and protected by a number of insulative and (semi)conductive layers and/or are commonly buried underground or are positioned high overhead. There is a desire to directly monitor or measure the temperature of the on-line electrical conductor, for example, directly at the cable splices or the junctions.

Briefly, in one aspect, the present disclosure describes systems and methods for directly sensing, measuring, or monitoring the temperature of an electrical conductor of a power cable. Some embodiments described herein provide a temperature sensitive capacitor that is in direct thermal contact with the electrical conductor. The temperature sensitive capacitor includes a dielectric material that has a dielectric constant variable with the temperature of the electrical conductor. The temperature of the electrical conductor can be sensed, measured, or monitored by measuring the capacitance of the temperature sensitive capacitor.

In some embodiments, a temperature sensitive capacitor has a capacitor body surrounding the electrical conductor to maximize the thermal contact area therebetween. This arrangement can provide more robust and reliable temperature measurement for the electrical conductor. Electrodes in an interdigitated configuration are provided, and the sensitivity of the capacitors on temperature can be controlled by varying the geometry of the electrodes.

In one embodiment, a temperature-sensing apparatus for sensing a temperature of an electrical conductor enclosed in at least one (semi)conductive layer, is provided. The apparatus includes a temperature sensitive capacitor. The temperature sensitive capacitor includes a capacitor body and at least two electrodes arranged in an interdigitated configuration. The electrodes are supported by the capacitor body. At least a portion of the capacitor body includes one or more temperature-sensitive dielectric materials that have a dielectric constant varying with temperature. The electrodes are disposed in proximity to the temperature-sensitive dielectric materials. The capacitor body is disposed in thermal contact with the electrical conductor, and the capacitance of the temperature sensitive capacitor is variable with the temperature of the electrical conductor.

In another embodiment, an electrical cable assembly includes an electrical conductor enclosed in a (semi)conductive layer and one or more temperature-sensing apparatuses each for sensing a temperature of the electrical conductor. The temperature-sensing apparatuses are distributed along the electrical conductor and configured to sense a temperature distribution of the electrical conductor. Each of the temperature-sensing apparatus includes a temperature sensitive capacitor. The temperature sensitive capacitor includes a capacitor body and at least two electrodes arranged in an interdigitated configuration. The electrodes are supported by the capacitor body. At least a portion of the capacitor body includes one or more temperature-sensitive dielectric materials that have a dielectric constant varying with temperature. The electrodes are disposed in proximity to the temperature-sensitive dielectric materials. The capacitor body is disposed in thermal contact with the electrical conductor, and the capacitance of the temperature sensitive capacitor is variable with the temperature of the electrical conductor.

In another embodiment, a power cable splice assembly includes first and second electrical conductors, a connector surrounding and connecting the first and second electrical conductors, and a (semi)conductive layer enclosing the first and second electrical conductors and the connector. A temperature-sensing apparatus includes a temperature sensitive capacitor disposed between the first or second electrical conductor and the (semi)conductive layer. The temperature sensitive capacitor includes a capacitor body and at least two electrodes arranged in an interdigitated configuration and supported by the capacitor body. At least a portion of the capacitor body includes one or more temperature-sensitive dielectric materials that have a dielectric constant varying with temperature. The electrodes are disposed in proximity to the temperature-sensitive dielectric materials. The capacitor body is disposed in thermal contact with the electrical conductor, and the capacitance of the temperature sensitive capacitor is variable with the temperature of the electrical conductor.

Various unexpected results and advantages are obtained in exemplary embodiments of the disclosure. One such advantage of exemplary embodiments of the present disclosure is that the thermal contact surface area between a temperature sensitive capacitor and an electrical conductor can be maximized. The measured temperature of the electrical conductor can be an average temperature, instead of a localized temperature of a limited area on the surface of the electrical conductor. The embodiments described herein can provide more robust and reliable temperature measurement for the electrical conductor. In addition, the sensitivity of the capacitor on temperature can be controlled by varying the geometry of electrodes arranged in an interdigitated configuration.

LISTING OF EXEMPLARY EMBODIMENTS

Exemplary embodiments are listed below as aspects. It is to be understood that any of embodiments A to O and P to X can be combined.

Embodiment A

A temperature-sensing apparatus for sensing a temperature of an electrical conductor enclosed in at least one (semi)conductive layer, the apparatus comprising:
a temperature sensitive capacitor, the temperature sensitive capacitor comprising a capacitor body and at least two electrodes arranged in an interdigitated configuration and supported by the capacitor body, at least a portion of the capacitor body comprising one or more temperature-sensitive dielectric materials that have a dielectric constant varying with temperature, and the electrodes being disposed in proximity to the temperature-sensitive dielectric materials, wherein the capacitor body is disposed in thermal contact with the electrical conductor, and the capacitance of the temperature sensitive capacitor is variable with the temperature of the electrical conductor.

Embodiment B

The apparatus of embodiment A, wherein the capacitor body has a ring-shape structure with an inner surface and an outer surface.

Embodiment C

The apparatus of embodiment B, wherein the capacitor body surrounds the electrical conductor and is flexible to have the inner surface thereof to compress against and be in thermal contact with a circumferential surface of the electrical conductor, and the electrodes are disposed on the outer surface of the capacitor body or embedded into the capacitor body.

Embodiment D

The apparatus of any of embodiments A to C, wherein the capacitor body further includes a thermal-conductive portion in direct contact with the electrical conductor.

Embodiment E

The apparatus of any preceding embodiment, wherein the electrodes include first and second electrodes that are arranged in an interdigitated comb configuration.

Embodiment F

The apparatus of any preceding embodiment, wherein the capacitor is disposed between the electrical conductor and the (semi)conductive layer, and enclosed by the (semi) conductive layer.

Embodiment G

The apparatus of any preceding embodiment, wherein the temperature-sensitive dielectric materials include one or more synthetic polymers.

Embodiment H

The apparatus of embodiment G, wherein the synthetic polymers include at least one of nylon-6 and nylon-6,6.

Embodiment I

The apparatus of any preceding embodiment, wherein the temperature-sensitive dielectric materials include particles of a ferroelectric ceramic material that are dispersed in a polymer matrix.

Embodiment J

The apparatus of embodiment I, wherein the polymer matrix comprises polymers selected from the group consisting of silicones, epoxies, ethylene-propylene-diene rubbers, polyolefins, polyurethanes, epichlorohydrins, fluoroelastomers, polyolefins, polyamides, and polyimides.

Embodiment K

The apparatus of embodiment I or J, wherein the ferroelectric ceramic material comprises between about 15 weight % and about 90 weight % of the capacitive sensing composition.

Embodiment L

The apparatus of any one of embodiments I to K, wherein the ferroelectric ceramic material is chosen from the group consisting of doped $BaTiO_3$, $BaSnTiO_3$, $BaHfTiO_3$, $BaSrTiO_3$, $BaZrTiO_3$, $SrTiO_3$, $BaFe_{12}O_{19}$, $Pb[Zr_xTi_{(1-x)}]O_3$, and $x[Pb(Mg_{1/3}Nb_{2/3})O_3]-(1-x)[PbTiO_3]$, and combinations and mixtures thereof.

Embodiment M

The apparatus of any preceding embodiment, further comprising an inductor that is electrically connected to the interdigitated capacitor to form a passive LC circuit.

Embodiment N

The apparatus of embodiment M, further comprising a transceiver unit electromagnetically coupled to the passive LC circuit, and the transceiver unit being configured to send out a signal representing a change of the capacitance of the interdigitated capacitor upon a change of the temperature of the electrical conductor.

Embodiment O

An electrical cable assembly comprising:
an electrical conductor enclosed in a (semi)conductive layer; and
one or more of the temperature-sensing apparatuses of any preceding embodiment,
wherein the temperature-sensing apparatuses are distributed along the electrical conductor and configured to sense a temperature distribution of the electrical conductor.

Embodiment P

A power cable splice assembly comprising:
first and second electrical conductors;
a connector surrounding and connecting the first and second electrical conductors;
a first (semi)conductive layer enclosing the first and second electrical conductors and the connector; and
a temperature-sensing apparatus comprising a temperature sensitive capacitor disposed between the first or second electrical conductor and the first (semi)conductive layer, the temperature sensitive capacitor comprising a capacitor body and at least two electrodes arranged in an interdigitated configuration and supported by the capacitor body, at least a portion of the capacitor body comprising one or more temperature-sensitive dielectric materials that have a dielectric constant varying with temperature, and the electrodes being disposed in proximity to the temperature-sensitive dielectric materials, wherein the capacitor body is disposed in thermal contact with the electrical conductor, and the capacitance of the temperature sensitive capacitor is variable with the temperature of the electrical conductor.

Embodiment Q

The assembly of embodiment P, wherein the capacitor body has a ring-shape structure with an inner surface and an outer surface.

Embodiment R

The assembly of embodiment Q, wherein the capacitor body surrounds the electrical conductor and is flexible to have the inner surface thereof to compress against and be in thermal contact with a circumferential surface of the electrical conductor, and the electrodes are disposed on the outer surface of the capacitor body or embedded into the capacitor body.

Embodiment S

The assembly of any one of embodiments P to R, wherein the capacitor body further includes a thermal-conductive portion in direct contact with the electrical conductor.

Embodiment T

The assembly of any one of embodiments P to R, wherein the electrodes include first and second electrodes that are arranged in an interdigitated comb configuration.

Embodiment U

The assembly of any one of embodiments P to R, wherein the temperature-sensitive dielectric materials include one or more synthetic polymers.

Embodiment V

The assembly of embodiment U, wherein the synthetic polymers include at least one of nylon-6 and nylon-6,6.

Embodiment W

The assembly of any one of embodiments P to R, wherein the temperature-sensing apparatus further comprises an inductor that is electrically connected to the capacitor to form a passive LC circuit.

Embodiment X

The assembly of embodiment W, wherein the temperature-sensing apparatus further comprises a transceiver unit electromagnetically coupled to the passive LC circuit, and the transceiver unit is configured to send out a signal representing a change of the capacitance of the capacitor upon the change of the temperature of the first or second electrical conductor.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides embodiments of systems and methods for monitoring a temperature of an electrical conductor of, for example, medium or high voltage (e.g., >1 kV or >10 kV) power cables. It may be particularly useful to perform such monitoring by means of a "passive" apparatus, by which is meant an apparatus that does not require an internal power source (e.g., battery) and that does not need to be physically connected to an external power source. One type of passive apparatus that can find use in such applications relies on an LC circuit (i.e., an inductive-capacitive circuit). An appropriately designed LC circuit can exhibit a resonant frequency, which resonant frequency can be monitored (whether continuously or discontinuously) without necessarily requiring any wire connection to be made to the apparatus, as will be appreciated by the skilled person. When such an apparatus uses a temperature sensitive capacitor that is placed in thermal communication or contact with a portion of a power cable, a change in temperature of that portion of the power cable can cause the temperature of the temperature sensitive capacitor to change commensurately. This temperature change can change the resonant frequency of the LC circuit, which can be detected and used to infer the temperature of that portion of the power cable.

Figure 1:
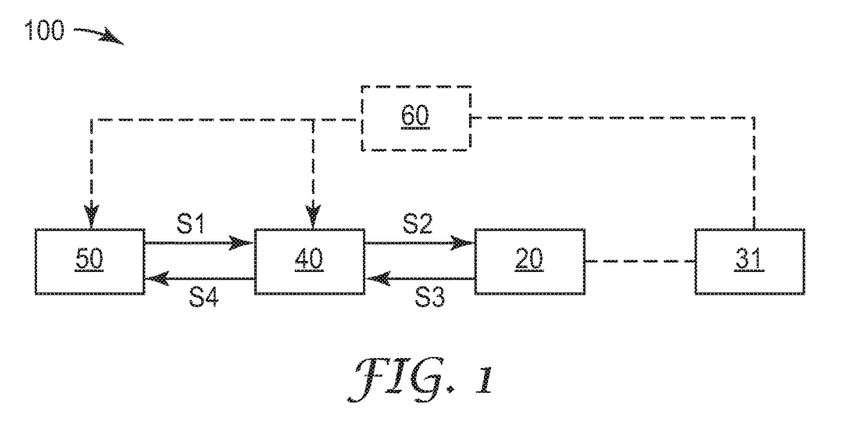
FIG. 1 is a schematic block diagram of a system for monitoring temperature of an electrical conductor, according to one embodiment.

FIG. 1 is a schematic diagram of a system 100 for monitoring a temperature of an electrical conductor 31 according to one embodiment. The system 100 includes a passive inductive unit 20, a transceiver unit 40, and a control unit 50. The passive inductive unit 20 is configured to include at least one temperature sensitive capacitor as described hereinafter. The temperature sensitive capacitor has a characteristic parameter that varies with temperature and is configured to be in thermal contact with the electrical conductor 31. In some embodiments, the temperature sensitive capacitor is in direct contact with the outer surface of the electrical conductor 31.

In some embodiments, the passive inductive unit 20 can have a resonance frequency and/or Q value that varies with the temperature of the electrical conductor 31. The transceiver unit 40 can be electromagnetically coupled to the passive inductive unit 20, and send out a signal representing the resonance frequency and/or Q value of the inductive unit 20. The control unit 50 can communicate with the transceiver unit 40 to ascertain the signal representing the resonance frequency and/or Q value, and to determine a value of the temperature of the electrical conductor 31 based on the ascertained signal representing the resonance frequency and/or Q value. In some embodiments, the system 100 may further include an optional central monitoring unit. The optional central monitoring unit can communicate with the control unit 50 wirelessly (e.g., through mobile network) or through wires to receive the determined value of the temperature of the electrical conductor 31 and make decisions accordingly.

In some embodiments, during operation, if there is a need to monitor the temperature of the electrical conductor 31, the control unit 50 may send out an instruction signal S1 to the transceiver unit 40. Once the transceiver unit 40 receives the instruction signal S1, it then sends out an excitation signal S2 to the inductive unit 20. The excitation signal S2 can induce the inductive unit 20 to oscillate. The transceiver unit 40 can detect an oscillation signal S3 from the inductive unit 20 and then send out a feedback signal S4 to the control unit 50. The oscillation signal S3 and the feedback signal S4 contain the information representing the resonance frequency and/or Q value of the inductive unit 20, which can be varied with the temperature of the electrical conductor 31. The control unit 50 can determine a value of the temperature of the electrical conductor 31 based on the ascertained feedback signal S4.

In some embodiments, the system 100 may further include an optional energy harvesting unit 60. The energy harvesting unit 60 can be adapted to harvest electrical power from the electrical conductor 31 when an AC current flows through the electrical conductor 31 and to supply the harvested electrical power to the transceiver unit 40 and/or the control unit 50.

Figure 2:
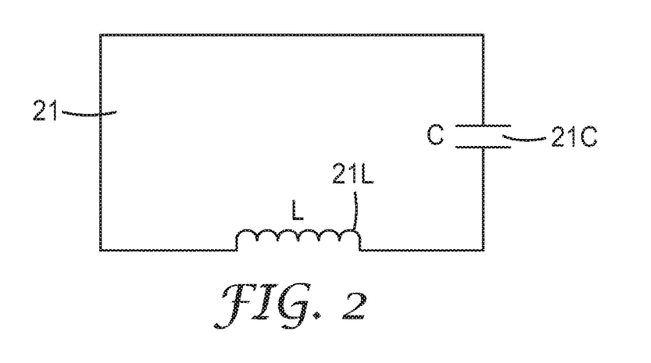
FIG. 2 is a schematic circuit diagram of an LC loop of a system for monitoring temperature of an electrical conductor, according to one embodiment.

In one embodiment, the inductive unit 20 can include an inductor-capacitor (LC) loop 21 as shown in FIG. 2. The LC loop 21 includes a temperature sensitive capacitor 21C and an inductor 21L electrically connected in series, e.g. via a wire. The temperature sensitive capacitor 21C has a capacitance that varies with temperature. In this instance, during practical application, the temperature sensitive capacitor 21C can be in thermal contact or in direct contact with the outer surface of the electrical conductor 31 of FIG. 1. The inductor 21L can be any type of inductor including, for example, an inductive coil, a printed antenna, etc. It can be understood that the LC loop 21 may include one or more capacitors and/or one or more inductors.

The resonance frequency $f_r$ of the LC loop 21 can be calculated according to the formula (1) given as below:

$$f_r = \frac{1}{2\pi\sqrt{LC}}, \qquad (1)$$

in which L denotes a value of inductance, e.g. the inductance of the inductor 21L; C denotes a value of capacitance, e.g. the capacitance of the capacitor 21C.

In actuality, the LC loop 21 may have some resistive, dissipative, and/or absorptive loss, which can be modeled as a single small series resistance, Rs. The Q value of such an LC loop 21 can be calculated according to the formula (2) given below:

$$Q = \frac{\omega_0 L}{R_s} = \frac{1}{\omega_0 C R_s}, \qquad (2)$$

where $\omega_0 = 2\pi f_r$, and where $f_r$ is the resonant frequency.

It can be seen that if either the inductance or the capacitance of the LC loop 21 is changed, the resonance frequency $f_r$ and Q value will change accordingly. In the embodiments as shown in FIG. 2, the capacitor 21C is temperature sensitive and is configured to be in thermal contact with the electrical conductor 31. The temperature of the temperature sensitive capacitor 21C can vary with the change in the temperature of the electrical conductor 31, thereby causing a change in the capacitance of the capacitor 21C. Consequently, the resonance frequency $f_r$ and the Q value of the LC loop 21 can vary with different temperature of the electrical conductor 31.

In some embodiments, a series of coupled inductive unit and transceiver unit such as, for example, the inductive unit 20 and the transceiver unit 40 of FIG. 1, can be distributed along an electrical conductor of a power cable such as the electrical conductor 31. Each of the coupled inductive units and transceiver units can measure a local temperature of a portion of the electrical conductor that is in thermal contact with the respective inductive unit (e.g., the inductive unit 20). The measured local temperatures can be received by the control unit 50 to determine a temperature distribution along the electrical conductor.

Figure 3:
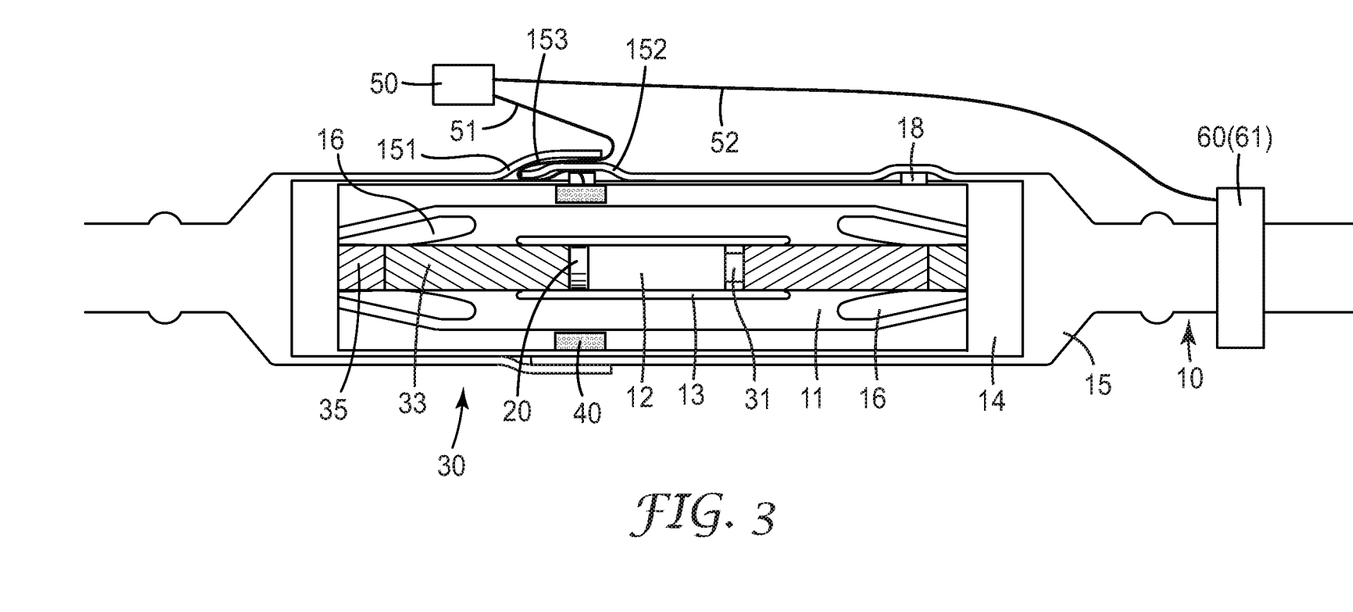
FIG. 3 is a partial cut-away schematic view of application of a system for monitoring temperature of an electrical conductor in a cable splice assembly, according to one embodiment.

FIG. 3 illustrates application of the system 100 of FIG. 1 including the passive inductive unit 20, the transceiver unit 40, and the control unit 50 for monitoring or measuring temperature of the electrical conductor 31, for example enclosed in a cable splice assembly 30, according to one embodiment.

In the cable splice assembly 30, two sections of an electrical cable 10 are spliced. Each section of the electrical cable 10 includes the electrical conductor 31, an insulation layer 33, and a (semi)conductive layer 35. The insulation layer 33 and the (semi)conductive layer 35 enclose the electrical conductor 31. A connector 12 concentrically surrounds the spliced electrical conductors 31. A first (semi)conductive (or electrode) layer 13, in this case a metallic layer, concentrically surrounds the spliced electrical conductors 31 and the connector 12, forming a shielding Faraday cage around the connector 12 and the electrical conductors 31. In some embodiments, "(semi)conductive" indicates that the layer may be semi-conductive or conductive, depending on the particular construction. An insulating layer 11 (containing geometric stress control elements 16) surrounds the first (semi)conductive layer 13. The foregoing construction is placed inside a second (semi)conductive layer 14, in this case a metallic housing, which functions as a shield and ground layer. A resin can be poured into the metallic housing 14 through one of the ports 18 to fill in the area around insulating layer 11. A shrinkable sleeve layer 15 serves as an outermost layer.

In this embodiment, portions of the electrical conductors 31 are covered by the connector 12 and then are enclosed by the first (semi)conductive layer 13, the insulating layer 11, the second (semi)conductive layer 14, and the shrinkable sleeve layer 15. In this embodiment, the shrinkable sleeve layer 15 includes two overlapping sections 151 and 152 to leave a passage 153 between the overlapping portions. The passage 153 is from the outside of the shrinkable sleeve layer 15 through the port 18 on the second (semi)conductive layer 14 to the inside of the second (semi)conductive layer 14.

As shown in FIG. 3, the passive inductive unit 20 is positioned adjacent to one of the electrical conductors 31 and inside the first (semi)conductive layer 13. Preferably, a portion of the electrical conductor 31 is exposed between the insulation layer 33 of the electrical cable 10 and the connector 12, and the passive inductive unit 20 may be positioned around the exposed portion of the electrical conductor 31. More detailed description about the position of the passive inductive unit 20 will be given hereinafter with reference to FIG. 6.

Figure 4:
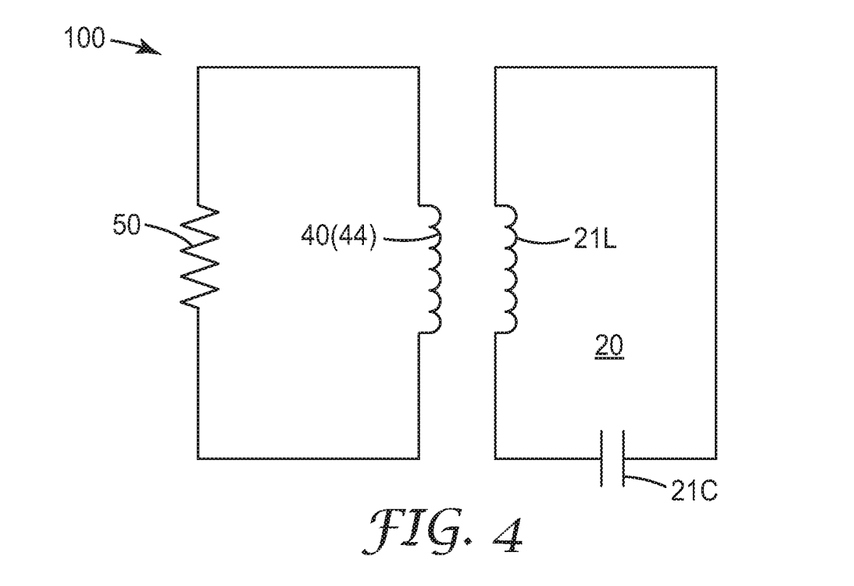
FIG. 4 is a schematic circuit diagram of a system for monitoring temperature of an electrical conductor, according to one embodiment.

The transceiver unit 40 is positioned outside the first (semi)conductive layer 13 and inside the second (semi)conductive layer 14, i.e. between the first (semi)conductive layer 13 and the second (semi)conductive layer 14. In one embodiment as shown FIG. 4, the transceiver unit 40 includes an inductor 44 that can include any type of inductor including, for example, an inductive coil, a printed antenna, etc. The inductor 44 can be positioned around the insulating layer 11 of FIG. 3. In some embodiments, the inductor 44 and the inductor 21L of the passive inductive unit 20 can be located in a same cross section, so as to improve the electromagnetic coupling. More detailed description about embodiments of the transceiver unit 40 and its positioning will be provided hereinafter with reference to FIG. 5.

In some embodiments, a pairing of the passive inductive unit 20 and the transceiver unit 40 can be located at a specific portion of the electrical cable 10 outside the assembly 30. The passive inductive unit 20 can be disposed adjacent to the electrical conductor 31 and enclosed by the (semi)conductive layer 35 and the insulation layer 33 of the electrical cable 10. The transceiver unit 40 can be located outside the (semi)conductive layer 35 and configured to be electromagnetically coupled with the passive inductive unit 20. A series of such pairings can be distributed along the electrical cable 10 to provide a temperature distribution of the electrical conductor 31.

Referring again to FIG. 3, the control unit 50 is configured to communicate with the transceiver unit 40 through a wire 51. The wire 51 can be accommodated within the passage 153 so that the wire 51 can extend from the transceiver unit 40, through the port 18, to the control unit 50. The optional energy harvesting unit 60 including a power inductive coil 61 can be located outside the assembly 30 and around the cable 10, or located between the second (semi)conductive layer 14 and the shrinkable sleeve layer 15. The energy harvesting unit 60 can be used to supply power to the transceiver unit 40 and/or the control unit 50 through a wire 52. Throughout this specification, although the wire 51 and the wire 52 are each referred to as a "wire," it should be understood that either or both of wire 51 and wire 52 may include multiple wires as needed for the system to function.

In some embodiments, the inductive coil 61 of the optional energy harvesting unit 60 can include, for example, an iron-core current transformer, an air-core current transformer, or a Rogowski coil. The inductive coil 61 can be positioned outside the first (semi)conductive layer 13, or outside the second (semi)conductive layer if one is used. Preferably, the energy harvesting unit 60 may be used mainly to provide the harvested electrical power to the transceiver unit 40, so the energy harvesting unit 60 can be positioned outside the layer in which the transceiver unit 40 is located. Thus, the energy harvesting unit 60 may be electrically connected with the transceiver unit 40 via one or more wires. In some embodiments, the energy harvesting unit 60 may further include an optional rectifier circuit to adapt the harvested electrical power right for the transceiver unit 40 and/or the control unit 50.

Figure 5:
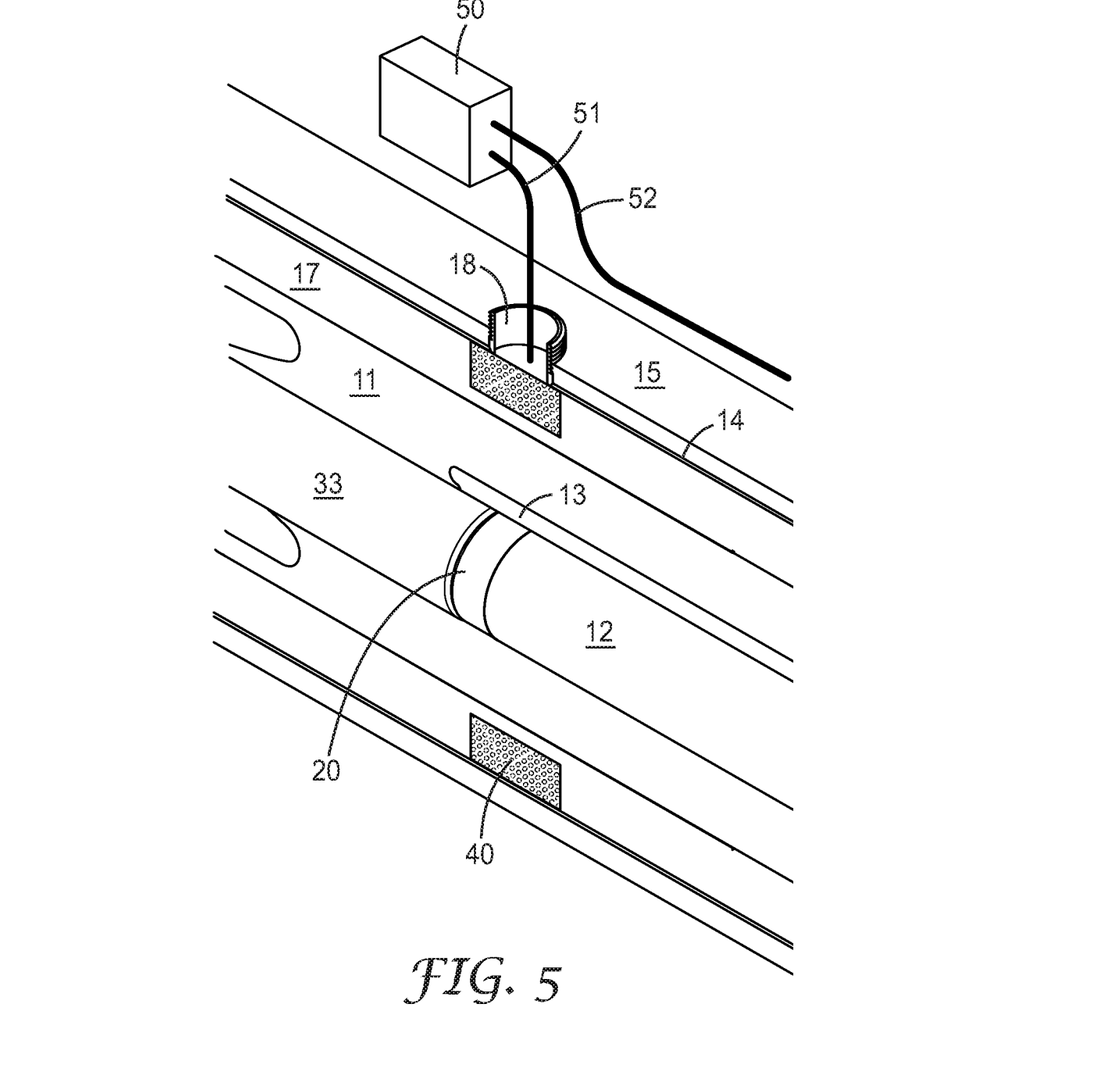
FIG. 5 is a sectional view of a portion of the electrical conductor in a cable splice assembly, for which the passive inductive unit of the system, according to one embodiment.

FIG. 5 illustrates a closer perspective view of the inductive unit 20 of FIG. 3 that is placed on the electrical conductor 31 adjacent to the connector 12. In the embodiment of FIG. 5, the shrinkable sleeve layer 15 is continuous and a hole has been cut in the shrinkable sleeve layer 15 to accommodate the port 18 and allow the egress of the wire 51.

Figure 6:
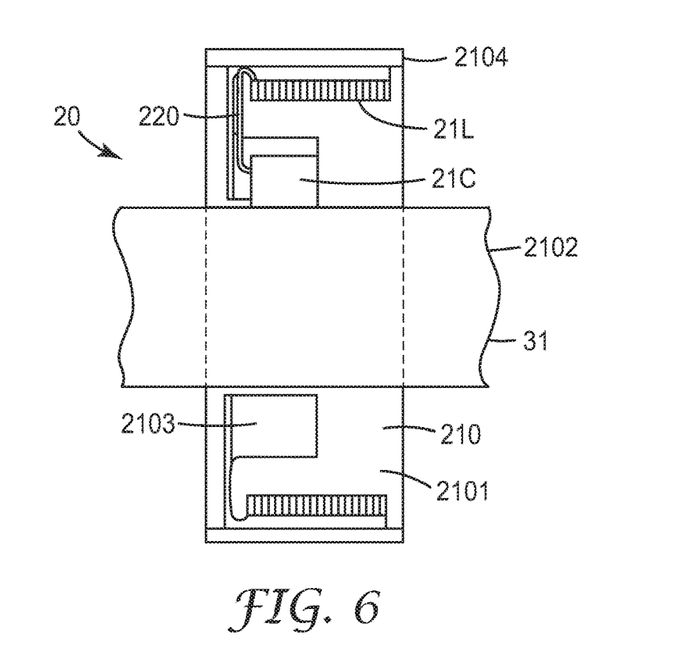
FIG. 6 is a partial cross-section side view of a portion of the cable splice assembly of FIG. 5.

FIG. 6 is an enlarged view illustrating an exemplary location of the passive inductive unit 20. As an example, the passive inductive unit 20 includes the inductor 21L and the temperature sensitive capacitor 21C, as shown in FIG. 2. The inductor 21L and the temperature sensitive capacitor 21C are electrically connected via a wire 220. A fixture 210 is provided to install the inductor 21L and the temperature sensitive capacitor 21C. In the embodiment of FIG. 6, the fixture 210 includes a main body 2101 and a channel 2102. The channel 2102 is adapted to accommodate the electrical conductor 31 to have the electrical conductor 31 pass through the channel 2102. The main body 2101 has a chamber 2103 to accommodate the temperature sensitive capacitor 21C and the chamber 2103 can communicate with the channel 2102 in a way that the temperature sensitive capacitor 21C can be in thermal contact or direct contact with the outer surface of the electrical conductor 31 in operation. The inductor 21L is adapted to wind around the main body 2101. The fixture 210 further includes a cover 2104 to enclose the main body 2101.

Figure 7:
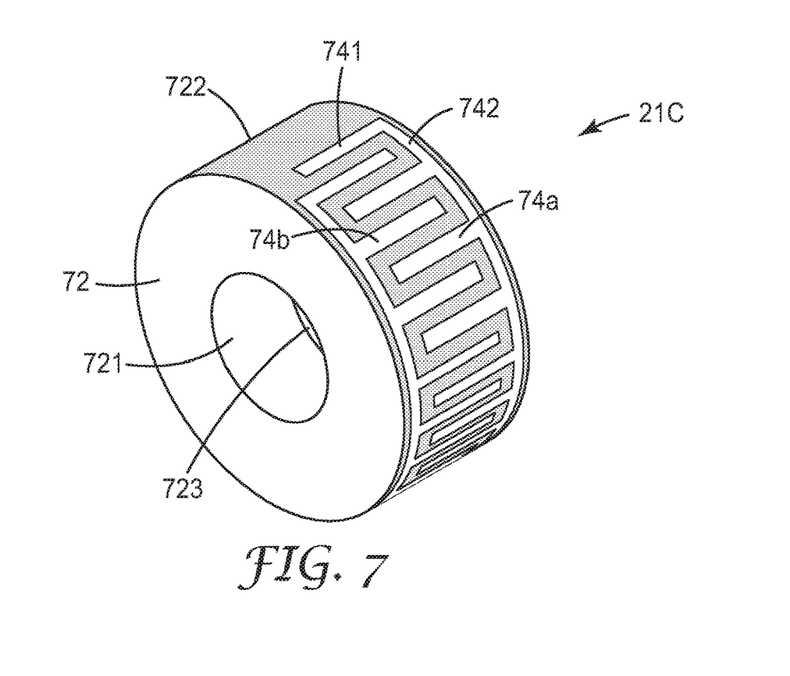
FIG. 7 is a perspective side view of a temperature sensitive capacitor, according to one embodiment.

FIG. 7 illustrates a perspective side view of the temperature sensitive capacitor 21C, according to one embodiment. The temperature sensitive capacitor 21C includes a capacitor body 72, and electrodes 74a and 74b supported by the capacitor body 72. In the embodiment of FIG. 7, the capacitor body 72 has a ring-shaped structure with an inner surface 721 and an outer surface 722. The inner surface 721 defines a channel 723.

The electrodes 74a and 74b are disposed on or embedded into the outer surface 722 of the capacitor body 72. At least a portion of the capacitor body 72 adjacent to the electrodes 74a and 74b includes a temperature sensitive dielectric material. The temperature sensitive dielectric material can be disposed, for example, between the electrodes 74a and 74b, on the top of electrodes 74a and 74b, and/or at the bottom of electrodes 74a and 74b. The temperature sensitive dielectric material of the capacitor body 72 separates the electrodes 74a and 74b and acts in combination with the electrodes 74a and 74b to form an interdigitated capacitor.

In the embodiment of FIG. 7, the electrodes 74a and 74b are arranged in an interdigitated comb configuration. Each of the electrodes 74a and 74b includes an arrangement of electrically conductive lines or "fingers" 741 electrically connected by respective end lines 742. The fingers 741 are arranged in an interdigitated configuration. The fingers 741 each can have a length L, a width W, and a thickness T. The fingers 741 can be disposed parallel to each other with a gap G1 therebetween. In some embodiments, the length L, the width W, and the gap G1 can be, for example, from several micrometers to several centimeters, and the thickness T can be, for example, from several nanometers to several mms. It is to be understood that the dimensions of the electrodes 74a and 74b can be predetermined according to the size of the capacitor body 72 and/or the diameter of the electrical conductor 31. It is also to be understood that the fingers 741 can be provided in any suitable geometric form or configuration to form an interdigitated capacitor.

In some embodiments, the electrodes 74a and 74b can be disposed on the outer surface 722 of the capacitor body 72. In some embodiments, at least a portion of the fingers 741 can be embedded into the outer surface 722 of the capacitor body 72 along the thickness direction. The electrodes 74a and 74b can be made of any appropriate electrically conductive materials such as, for example, metals, metal alloys, metal-filled polymers, etc.

In some embodiments, the electrodes 74a and 74b can be completely embedded into the capacitor body 72. In one embodiment, the electrodes 74a and 74b can be disposed adjacent to the outer surface 722. In another embodiment, the electrodes 74a and 74b can be disposed adjacent to the inner surface 721. In another embodiment, the fingers of electrodes 74a and 74b can be disposed inside the capacitor body 72 and between the outer surface 722 and the inner surface 721.

In some embodiments, the capacitor 21C can further include an optional ring structure that can be disposed coaxially with the capacitor body 72 and can cover the outer surface 722 and the electrodes 74a and 74b thereon. The optional ring structure can include one or more dielectric materials that have the same or different relative permittivity (or dielectric constant) compared to the material of capacitor body 72.

In some embodiments, the capacitance of the capacitor 21C can be changed by varying the dielectric constant of the capacitor body 72. The change can be nonlinear as compared to the linear relationship in a conventional parallel plate capacitor. In some embodiments, a desired capacitance of the capacitor 21C can be obtained by varying geometry parameters of the electrodes 74a and 74b including, for example, the length L, the width W, the thickness T, the gap G1, etc. It is to be understood that the capacitor 21C can include more than two electrodes. In some embodiments, the capacitor 21C may also include optional ground electrodes and optional guard electrodes.

In some embodiments, the capacitance of the capacitor 21C may vary upon the change of its geometry with changing temperature. In some embodiments, the capacitor body 72 of the capacitor 21C may thermally expand or contract with varying temperature upon the thermal contact with the electrical conductor 31. In some embodiments, the capacitor body 72 can have a volumetric coefficient of thermal expansion of, for example, between $5 \times 10^{-6} K^{-1}$ to $50 \times 10^{-6} K^{-1}$ at 20° C. The thermal expansion of the capacitor body 72 may induce a change D1 for the capacitance of the capacitor 21C. In some embodiments, the geometry, shape, and/or relative location of the electrodes 74a and 74b may be changed with temperature, which may induce a change D2 for the capacitance of the capacitor 21C.

In some embodiments, the above capacitance changes D1 and/or D2 can be much lower (e.g., one order of magnitude lower) than the capacitance change induced by the change of dielectric constant of the material of capacitor body 72 with temperature, and the capacitance changes D1 and/or D2 can be negligible in terms of determining the temperature of the electrical conductor 31. In some embodiments, the above capacitance changes D1 and D2 can be pre-calibrated and separable from the capacitance change related to the change of dielectric constant of the capacitor body 72. After suitable pre-calibration, the capacitance changes D1 and/or D2 can be used to determine the temperature of the electrical conductor 31, independently or in corporation with the capacitance change related to the change of dielectric constant with temperature.

Referring to FIGS. 6 and 7, the temperature sensitive capacitor 21C is disposed in thermal contact with the electrical conductor 31 with the channel 723 being adapted to have the electrical conductor 31 to pass therethrough. The electrical conductor 31 can be in direct contact with the inner surface 721 of the capacitor body 72. While the capacitor body 72 shown in the embodiment of FIG. 7 has a ring-shaped structure, it is to be understood that the capacitor body can be any suitable shapes as long as a maximized contact surface can be provided to effectively exchange heat between the capacitor body 72 and the electrical conductor 31.

The inner surface 721 of the capacitor body 72 can circumferentially surround the outer surface of the electrical conductor 31. The temperature of a section of the electrical conductor 31 that is in thermal contact with the capacitor body 72 can be measured based on the change of the capacitance of the capacitor 21C. The measured temperature can be an average temperature of the whole circumferential surface area of the section in thermal contact, instead of a localized temperature of a limited area on the surface of the electrical conductor 31. This can provide more robust and reliable temperature measurement for the electrical conductor 31.

In some embodiments, the capacitor body 72 can be a unitary block of dielectric material that has a dielectric constant that varies with the temperature of the electrical conductor 31. In other embodiments, the capacitor body 72 may include an outer portion disposed adjacent to the outer surface 74b that contains temperature sensitive dielectric materials, and an optional thermal-conductive portion disposed adjacent to the inner surface 74a to support the temperature sensitive dielectric portion and to promote heat exchange between the outer portion and the electrical conductor 31. In some embodiments, the inner surface 721 of the capacitor body 72 can include a thermal-conductive material to promote the heat exchange between the capacitor body 72 and the electrical conductor 31.

In some embodiments, the capacitor body 72 can include an elastic material that is deformable so that the inner surface 721 of the capacitor body 72 can be pressed against the electrical conductor 31 to provide an intimate thermal contact therebetween.

In some embodiments described herein, the temperature sensitive capacitor 21C includes one or more temperature-sensitive dielectric materials, each having a respective dielectric constant varying with the temperature of the electrical conductor 31. In some embodiments, at least one of the temperature-sensitive dielectric materials can exhibit a positive slope of dielectric constant versus temperature over the temperature range of from 30 degrees C. to 150 degrees C. By a positive slope, it is meant that the temperature-sensitive dielectric material exhibits a dielectric constant change ($\delta k/K$; that is, the change in dielectric constant ratioed to a reference dielectric constant) as a function of temperature, with a magnitude of at least 0.1% per degree C., at least somewhere within the range of 30 degree C. to 150 degrees C. In various exemplary embodiments, the temperature-sensitive dielectric material may exhibit a dielectric constant change with a magnitude of at least 0.15, 0.2, 0.4, 0.8, 1.2, 1.6, or 2.4% per degree C., within the range of 30 degrees C. to 150 degrees C.

In some embodiments, at least one of the temperature-sensitive dielectric materials can exhibit a negative slope of dielectric constant versus temperature over the temperature range of from 30 degrees C. to 150 degrees C. By a negative slope, it is meant that the temperature-sensitive dielectric material exhibits a dielectric constant change ($\delta k/K$; that is, the change in dielectric constant ratioed to a reference dielectric constant) as a function of temperature, with a magnitude of at least −0.1% per degree C., at least somewhere within the range of 30 degree C. to 150 degrees C. In various exemplary embodiments, the temperature-sensitive dielectric material may exhibit a dielectric constant change with a magnitude of at least −0.15, −0.2, −0.4, −0.8, −1.2, −1.6, or −2.4% per degree C., within the range of 30 degrees C. to 150 degrees C.

In some embodiments, the overall loss tangent (tan $\delta$) of the temperature-sensitive dielectric material of the temperature sensitive capacitor 21C may be about 0.3 or less, over the temperature range of 30-150 degrees C., and at a frequency of 1 kHz to 20 MHz. In specific embodiments, the loss tangent may be measured at a frequency of 1 kHz to 100 kHz.

In some embodiments, the temperature-sensitive dielectric material includes one or more synthetic polymers. In some embodiments, the synthetic polymers can include at least one of nylon-6 and nylon-6,6.

In some embodiments, the temperature-sensitive dielectric material of the temperature sensitive capacitor 21C may include particles of ferroelectric ceramic material. Any suitable ceramic ferroelectric material that exhibits a measurable electrical Curie temperature that is below 30 degrees C., and that imparts capacitive sensing composition with a negative slope of capacitance versus temperature over the temperature range of from 30 degrees C. to 150 degrees C., can be used. In various embodiments, a potentially suitable material may be chosen from the group consisting of doped and/or modified $BaTiO_3$, $BaSnTiO_3$, $BaHfTiO_3$, $BaSrTiO_3$, $BaZrTiO_3$, $SrTiO_3$, $BaFe_{12}O_{19}$, $Pb[Zr_xTi_{(1-x)}]O_3$, and $x[Pb(Mg_{1/3}Nb_{2/3})O_3]\text{-}(1\text{-}x)[PbTiO_3]$, and combinations and mixtures thereof.

In some embodiments, the particles of ferroelectric ceramic material may be dispersed in a polymer matrix. The polymer matrix into which ferroelectric ceramic material particles may be dispersed if desired, can include any suitable polymer material. In some embodiments, the polymer matrix may comprise a thermoplastic composition, which may be e.g. raised to a sufficiently high temperature that the ferroelectric ceramic material particles can be adequately compounded into it, and then cooled to form a solid article. Or, such a polymer matrix may comprise a thermoset material, e.g. a liquid or semi-solid material into which the ferroelectric ceramic material can be dispersed and which can then be cured (by any suitable means, e.g. thermal energy, radiation, addition of catalysts and/or initiators, etc.) to form a solid article. The resulting composition might be stiff and rigid, or might be relatively elastomeric. However, it may not be strictly necessary that the resulting composition be solid. Rather, it might be a semi-solid, grease, gel, wax, mastic, or even an adhesive (e.g. a pressure-sensitive adhesive), if desired.

If dispersed in a polymer matrix, in various embodiments the ferroelectric ceramic material particles may make up at least about 30, 40, 50, 60, 65, or 70 weight % of the resulting composition (that is, of the total of the polymer matrix and the ferroelectric ceramic material, and of any other additives if present). In further embodiments, the ferroelectric ceramic material particles may comprise at most about 90, 80, 70, 60, 50, 40, or 30 weight % of the composition. In particular embodiments, the ferroelectric ceramic material particles may be provided in the polymer matrix at a weight (and volume) percent that approaches or exceeds the percolation threshold (at which point the absolute capacitance of the composition and/or its change in capacitance with temperature, may increase substantially).

In various embodiments, the polymer matrix may include, for example, urethane-based polymers; silicone-based polymers; EVA (ethylene-vinyl acetate) based polymers; EPDM (ethylene-propylene-diene rubber); olefinic polymers such as e.g. polyethylene or polypropylene; epoxy resins; fluorine-containing polymers (e.g., poly(tetrafluoroethylene), poly(vinylidene fluoride), polymers comprising hexafluoropropylene units, and copolymers and blends thereof), any other halogen-containing polymers (e.g., chlorinated and/or brominated polymers), polyethers, (meth)acrylic based polymers, and so on. In some embodiments, the polymer matrix can include polymers selected from the group consisting of silicones, epoxies, ethylene-propylene-diene rubbers, polyolefins, polyurethanes, epichlorohydrins, fluoroelastomers, polyolefins (e.g., polyethylene, polypropylene, etc.), polyamides (e.g., nylons and the like), polyimides (e.g., Kapton-type materials), and combinations thereof. It is emphasized that these are merely exemplary broad categories and that any suitable polymeric material, copolymer, or blend thereof may be used. (However, suitable polymeric materials may in general be nonconductive materials, and often may be essentially electrically insulative in nature.) The composition may also comprise any other suitable additive(s), for example to improve processability, weatherability, and so on. Potentially useful additives may thus include processing aids, mold release agents, stabilizers, antioxidants and plasticizers, and so on.

Some embodiments described herein provide temperature sensitive capacitors that have a maximized thermal contact surface with an electrical conductor. Some temperature sensitive capacitors have a ring-shaped structure and surround the electrical conductor to maximize the thermal contact area therebetween. This can provide more robust and reliable temperature measurement for the electrical conductor. Electrodes in an interdigitated configuration are provided adjacent to an outer surface of the capacitors, and the sensitivity of the capacitors on temperature can be controlled by varying the geometry of the electrodes.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

EXAMPLE

Example 1—Temperature Sensitive Capacitor

An exemplary temperature sensitive capacitor was fabricated for sensing a temperature of an electrical conductor (e.g., the electrical conductor 31 of FIG. 1). The temperature sensitive capacitor has a configuration as shown in FIG. 7. The capacitor body was made of Nylon-6 material. Electrodes were disposed on the outer surface of the capacitor body to form an interdigitated capacitor. Dielectric properties of the temperature sensitive capacitor were measured by using dielectric spectrometer according to ASTM standard test methods including ASTM D150 "Standard Test Methods for AC Loss Characteristics and Permittivity (Dielectric Constant) of Solid Electrical Insulation."

Figure 8:
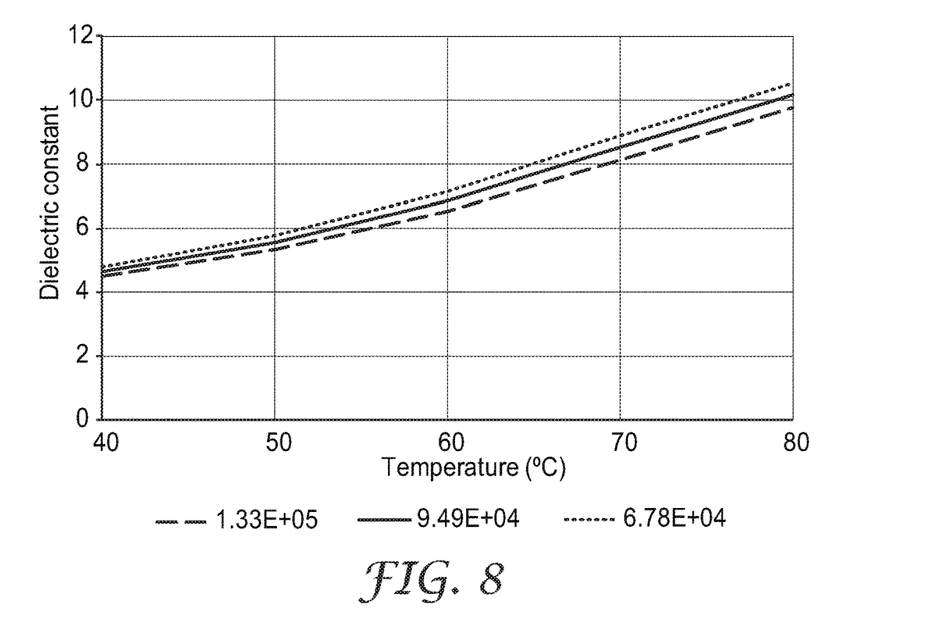
FIG. 8 is a graph showing the relationship between the temperature of an electrical conductor and the dielectric constant of a temperature sensitive capacitor, according to Example 1.

FIG. 8 is a graph showing the relationship between the temperature of the electrical conductor 31 and the dielectric constant of the capacitor body. The dielectric constant was measured at 133 kHz, 94.9 kHz, and 67.8 kHZ, respectively.

Figure 9:
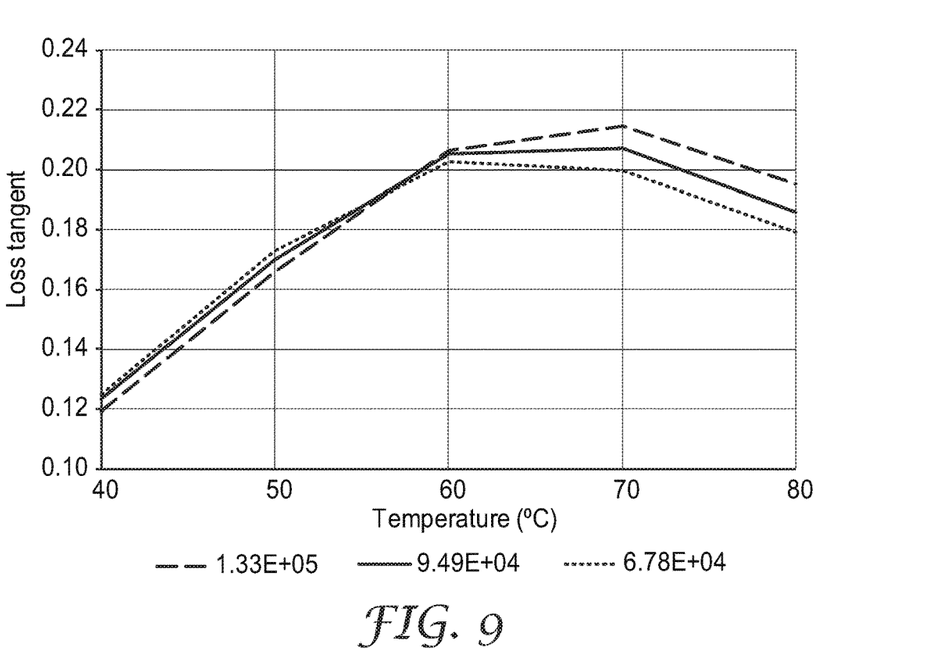
FIG. 9 is a graph showing the relationship between the temperature of an electrical conductor and the loss tangent of a temperature sensitive capacitor, according to Example 1.

FIG. 9 is a graph showing the relationship between the temperature of the electrical conductor 31 and the loss tangent of the capacitor body. The loss tangent was measured at 133 kHz, 94.9 kHz, and 67.8 kHZ, respectively.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth herein-above. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A temperature-sensing apparatus for sensing a temperature of an electrical conductor enclosed in at least a (semi) conductive layer, the apparatus comprising:
   a temperature sensitive capacitor, the temperature sensitive capacitor comprising a capacitor body and at least two electrodes arranged in an interdigitated configuration and supported by the capacitor body, at least a portion of the capacitor body comprising one or more temperature-sensitive dielectric materials that have a dielectric constant varying with temperature, and the electrodes being disposed in proximity to the temperature-sensitive dielectric materials,
   wherein the capacitor body is disposed in thermal contact with the electrical conductor, and the capacitance of the temperature sensitive capacitor is variable with the temperature of the electrical conductor,
   wherein the capacitor body has a ring-shape structure with an inner surface and an outer surface, and
   wherein the capacitor body surrounds the electrical conductor, and the capacitor body comprises an elastic material that is flexible and deformable to have the inner surface thereof compress against and be in thermal contact with a circumferential surface of the electrical conductor, and the electrodes are disposed on the outer surface of the capacitor body or embedded into the capacitor body.

2. The apparatus of claim 1, wherein the capacitor body further includes a thermal-conductive portion in direct contact with the electrical conductor.

3. The apparatus of claim 1, wherein the electrodes include first and second electrodes that are arranged in an interdigitated comb configuration.

4. The apparatus of claim 1, wherein the capacitor is disposed between the electrical conductor and the (semi) conductive layer, and is enclosed by the (semi)conductive layer.

5. The apparatus of claim 1, wherein the temperature-sensitive dielectric materials include one or more synthetic polymers.

6. The apparatus of claim 5, wherein the synthetic polymers include at least one of nylon-6 and nylon-6,6.

7. The apparatus of claim 1, wherein the one or more temperature-sensitive dielectric materials include particles of a ferroelectric ceramic material that are dispersed in a polymer matrix.

8. The apparatus of claim 7, wherein the polymer matrix comprises polymers selected from the group consisting of silicones, epoxies, ethylene-propylene-diene rubbers, polyolefins, polyurethanes, epichlorohydrins, fluoroelastomers, polyolefins, polyamides, and polyimides.

9. The apparatus of claim 7, wherein the ferroelectric ceramic material comprises between about 15 weight % and about 90 weight % of the capacitive sensing composition.

10. The apparatus of claim 7, wherein the ferroelectric ceramic material is chosen from the group consisting of doped $BaTiO_3$, $BaSnTiO_3$, $BaHfTiO_3$, $BaSrTiO_3$, BaZr- $TiO_3$, $SrTiO_3$, $BaFe_{12}O_{19}$, $Pb[Zr_xTi_{(1-x)}]O_3$, and $x[Pb(Mg_{1/3}Nb_{2/3})O_3]$-$(1-x)[PbTiO_3]$, and combinations and mixtures thereof.

11. The apparatus of claim 1, further comprising an inductor that is electrically connected to the interdigitated capacitor to form a passive LC circuit.

12. The apparatus of claim 11, further comprising a transceiver unit electromagnetically coupled to the passive LC circuit, and the transceiver unit being configured to send out a signal representing a change of the capacitance of the interdigitated capacitor upon a change of the temperature of the electrical conductor.

13. An electrical cable assembly comprising:
   an electrical conductor enclosed in a (semi)conductive layer; and
   one or more of the temperature-sensing apparatuses of claim 1,
   wherein the temperature-sensing apparatuses are distributed along the electrical conductor and configured to sense a temperature distribution of the electrical conductor.

\* \* \* \* \*